(12) United States Patent
Chern

(10) Patent No.: US 6,662,425 B2
(45) Date of Patent: Dec. 16, 2003

(54) COMBINATION MOBILE COMPUTER METAL SHELL FABRICATION METHOD

(76) Inventor: Hong-Line Chern, No. 21, Lane 457, Lung Chiang Rd, Taipei (TW)

(*) Notice: Subject to any disclaimer, the term of this patent is extended or adjusted under 35 U.S.C. 154(b) by 0 days.

(21) Appl. No.: 10/152,737

(22) Filed: May 23, 2002

(65) Prior Publication Data

US 2002/0133930 A1 Sep. 26, 2002

Related U.S. Application Data

(63) Continuation-in-part of application No. 09/558,873, filed on Apr. 28, 2000, now abandoned.

(51) Int. Cl.⁷ ................................................ B23P 11/00
(52) U.S. Cl. ............................... 29/525.01; 29/525.02; 29/525.11
(58) Field of Search .................. 29/525.01, 525.02, 29/525.11, 432, 428, 525.14; 361/685, 683, 680, 681, 686; 312/215

(56) References Cited

U.S. PATENT DOCUMENTS 5,706,168 A * 1/1998 Erler et al. .................. 361/685

FOREIGN PATENT DOCUMENTS

| GB | 2327053 | * | 1/1999 |
| JP | 0588128 | * | 3/1994 |
| JP | 410011400 | * | 1/1998 |

* cited by examiner

Primary Examiner—John C. Hong
(74) Attorney, Agent, or Firm—Rosenberg, Klein & Lee

(57) ABSTRACT

A method of fabricating a mobile computer metal shell is provided that includes the step of punching or forging a metal sheet to form a shell. Then, the step of milling and drilling is performed to form a shaped shell. Fitting members are next fixedly secured to the shaped shell at locations corresponding to the computer parts to be held, by means of adhesive bonding or welding. After the installation of the positioning members in the shaped shell, a plastic cover sheet is applied on the shaped shell.

1 Claim, 3 Drawing Sheets

COMBINATION MOBILE COMPUTER METAL SHELL FABRICATION METHOD

This is a CIP of application Ser. No. 09/558,873, filed Apr. 28, 2000 now abandoned.

BACKGROUND OF THE INVENTION

The present invention relates to a combination mobile computer metal shell and its fabrication method especially relates to a rectangular box type metal shell thereof. According to the fabrication method of the invention, a metal sheet member is selected and processed into the desired shape, and then different fitting members are respectively fastened to the shaped metal sheet member, and then a plastic cover is covered on the shaped metal sheet member.

Regular box type mobile computer shells are commonly injection-molded from plastics. Because a mobile computer shell must have fitting means for holding computer parts, it is difficult to form fitting means in different strength on the shell during the process of injection molding. Further, a plastic mobile computer shell has less strength against impact, and low heat dissipation and electromagnetic interference protection power.

A tendency of the development for a rectangular box type mobile computer is the increasing of the size from 6" or 8" to 12" even 14" for function improving, in which a problem of the weight of the metal shell will be a most essential consideration therefor.

U.S. Pat. No. 5,706,168, Erler et al, disclosed a impact notebook having metal sheels 26, 42 formed by casting (line 63 column to line 1 column 4), however, the metal shell for a notebook having a small size of 6" to 8", it can be control the thickness below 1.5 mm by die casting, but, in practice, it can't be done for a 12"~14" shell to maintain a thickness below 2.5 mm due to the limitation of the flow ability of the melted metal by die casting, it will be too heavy for the metal shell of a box type mobile computer having a thickness around 3 mm.

SUMMARY OF THE INVENTION

The present invention has been accomplished under the circumstances in view. It is one object of the present invention to provide a combination mobile computer shell which has a proper thickness for weight reducing. It is another object of the present invention to provide a combination mobile computer shell which provides satisfactory heat dissipation power. It is another object of the present invention to provide a combination mobile computer shell, which eliminates electromagnetic interference. It is still another object of the present invention to provide a combination mobile computer shell, which provides high impact resistance. It is still another object of the present invention to provide a combination mobile computer shell, which effectively protects the internal parts of the mobile computer against dust when the mobile computer is closed. According to one aspect of the present invention, a combination mobile computer shell is made by: processing a metal sheet member into a shaped shell by punching or hot forging, fastening different fitting members to the shaped shell for holding different computer parts, and covering the shaped shell with a plastic cover. According to another aspect of the present invention, the fitting members are fastened to the shaped shell by gluing, welding, or screw means subject to their strength.

DETAILED DESCRIPTION OF THE PREFERRED EMBODIMENT

Figure 1:
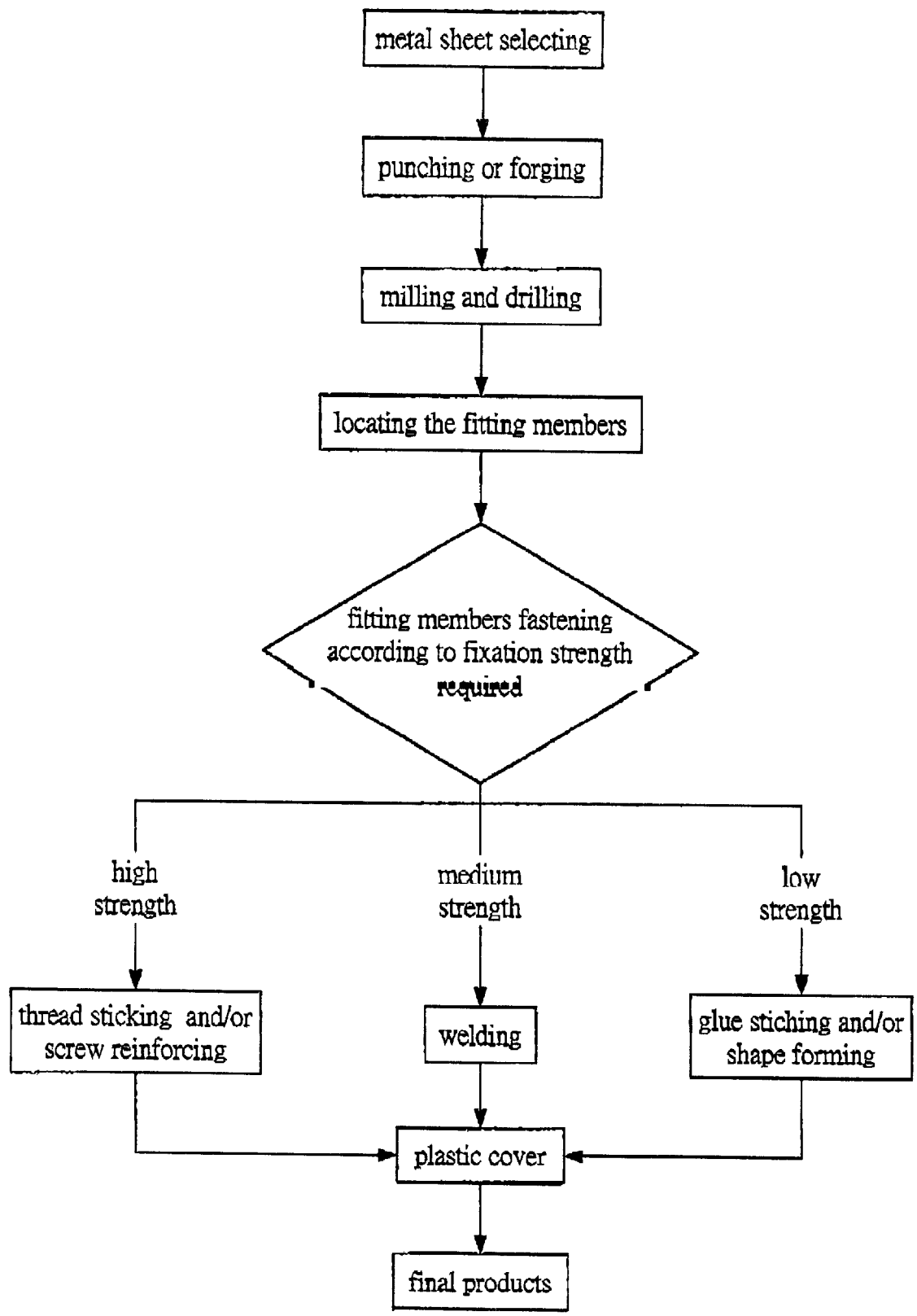
FIG. 1 is a mobile computer shell fabrication flow chart according to the present invention.

Referring to FIG. 1, a mobile computer shell fabrication method according to the present invention comprises the steps of:

(1) selecting a metal sheet member, for example, magnesium or aluminum alloy sheet member with a proper thickness from 1.0 to 2.0 mm according to the size of the shell designed for making a box type mobile computer shell;

(2) punching or forging the selected metal sheet to the form of a shell, and stamping the positional marks for different fitting members on the inner surface of the shell simultaneously.

(3) milling and drilling the metal sheet member into a shaped shell subject to a predetermined pattern;

(4) putting fitting members on the stamped marks of the shaped shell thus obtained at locations subject to the computer parts to be installed;

(5) selecting suitable fastening methods or means to fixedly secure the different fitting members to the shaped shell subject to the conditions of fixation strength required: using a glue sticking or using a shape-forming and bonding technique to fixedly secure plastic fitting members of low strength to the shaped shell; using a welding technique to secure metal fitting members of medium strength to the shaped shell; using a thread sticking and/or screws to reinforce the fixation between metal fitting members of high strength and the shaped shell for supporting important computer parts against impact;

(6) fixedly fastening the fitting members to the shaped shell subject to the fastening methods selected in step (4); and (7) covering a plastic cover on the shaped shell having fitting members installed therein.

Because the shell and the fitting members are separately made, the fabrication of the shell is simple and easy. Further, because the shaped shell is a metal member, it has high compact strength, and can effectively isolate internal as well as external electromagnetic waves.

A fitting member can be a plastic hook or a sinked metal nut differed what a connecting strength is required.

Figure 2:
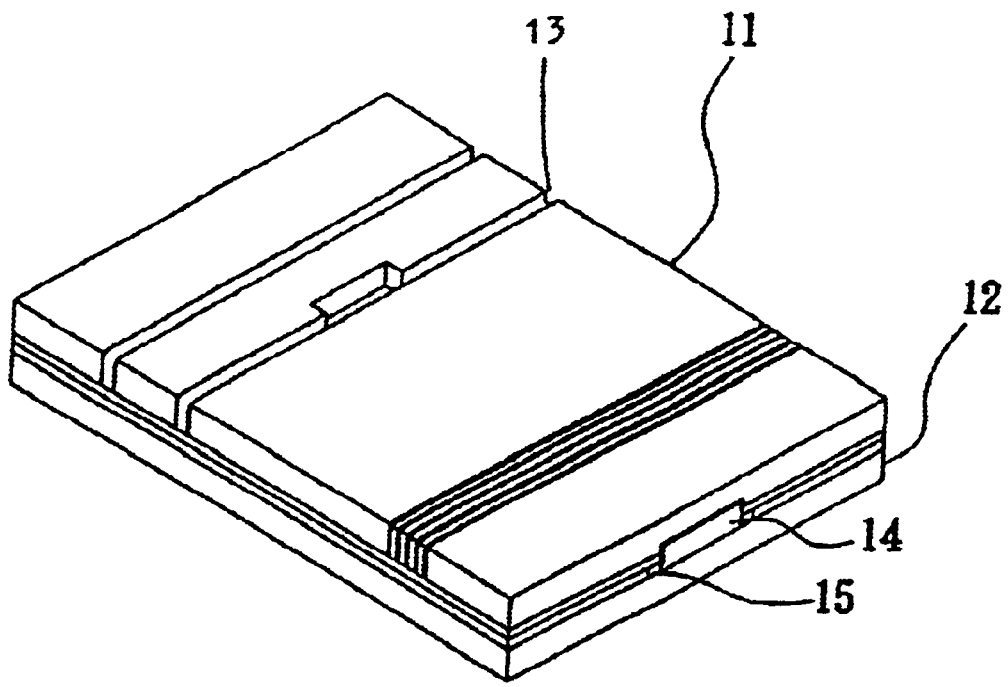
FIG. 2 illustrates a mobile computer shell constructed according to the present invention.
Figure 3:
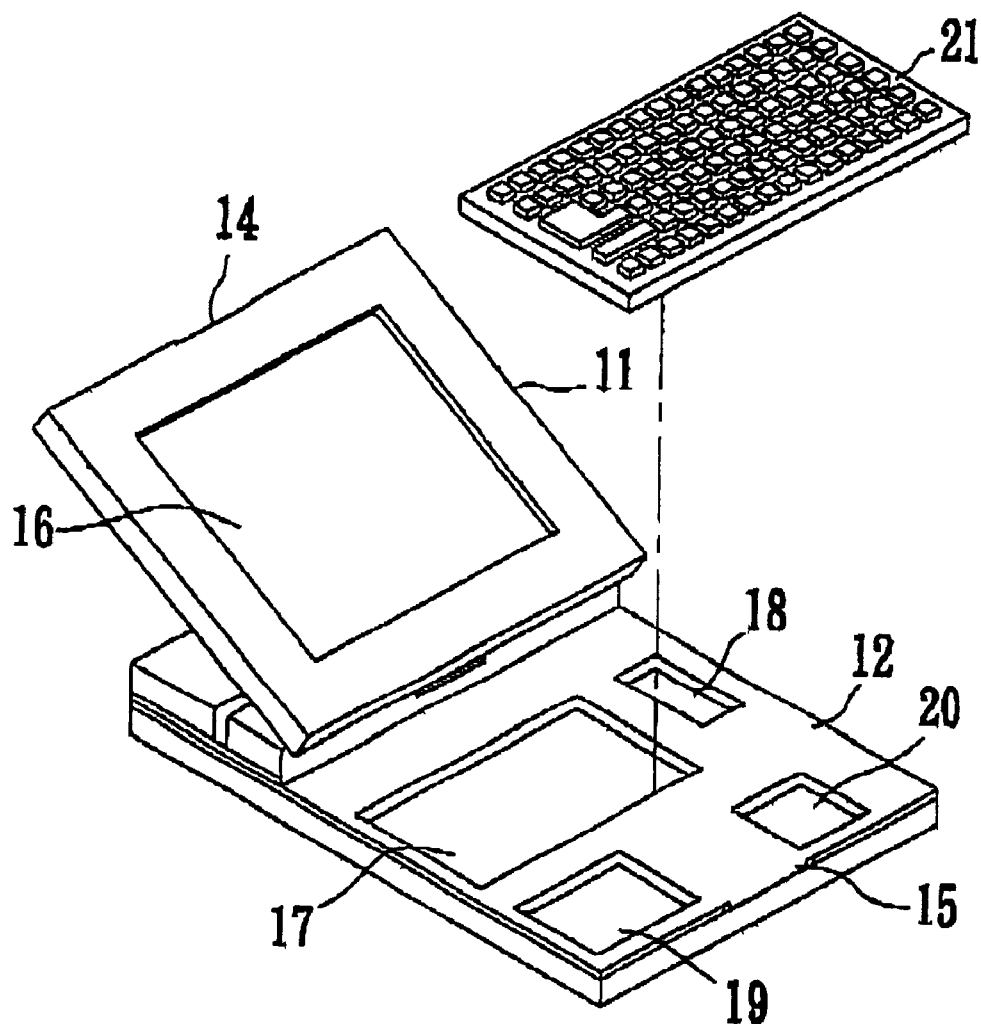
FIG. 3 shows the mobile computer shell of FIG. 2 opened.

Referring to FIGS. 2 and 3, a mobile computer shell in accordance with the present invention comprises a top cover 11 having at least one fitting member (not shown) for holding a display module 16, a bottom cover 12 having fitting members (not shown) for holding a mother board 17, a disk drive 18, a CD-ROM player 19, a battery box 20 and a keyboard 21, a hinge 13 coupled between the top cover 11 and the bottom cover 12 for enabling the top cover 11 and the bottom cover 12 to be turned relative to each other between the close position and the open position, a male locking member (for example, a springy plastic hook) 14 provided at one side of the top cover 11, and a female locking member (for example, a retaining groove) 15 provided at one side of the bottom cover 12 for engagement with the male locking member 14 at the top cover shell 11 to secure the top cover 11 and the bottom cover 12 in the close position, preventing dust and external electromagnetic waves from passing to the inside of the mobile computer and internal electromagnetic waves from passing to the outside of the mobile computer.

It is to be understood that the drawings are designed for purposes of illustration only, and are not intended for use as a definition of the limits and scope of the invention disclosed. For example, the fitting members can be fastened individually one by one as a single element, or be assembled of a number to a frame and/or a meshed element for a shape-forming and bonding technique. Further, the mobile computer shell can be designed for use with a notebook computer, palm-top computer, electronic dictionary, PDA, . . . and etc.

What the invention claimed is:

1. A mobile computer metal shell fabrication method comprising the steps of:
    (a) selecting one of an aluminum alloy metal sheet member or a magnesium alloy metal sheet member for making a mobile computer shell;
    (b) punching or hot forging said selected metal sheet member to a form of said shell and simultaneously stamping location marks for fitting members on an inner surface of said shell;
    (c) milling and drilling said metal sheet member into a shaped shell in correspondence with a predetermined pattern;
    (d) positioning said fitting members on said shaped shell at locations corresponding to computer parts to be held;
    (e) selecting different fastening methods to fixedly secure said fitting members to said shaped shell responsive to a strength of said fitting members;
    (f) fixedly fastening said fitting members to said shaped shell, plastic fitting members of low strength being adhesively affixed to said shaped shell, metal fitting members of medium strength being welded to said shaped shell, and metal fitting members of high strength being affixed to said shaped shell with threaded fasteners; and
    (g) covering a plastic cover on said shaped shell after the installation of said positioning members in said shaped shell.

* * * * *